(12) United States Patent
Voelker et al.

(10) Patent No.: US 10,228,531 B2
(45) Date of Patent: Mar. 12, 2019

(54) LENS DEVICE

(71) Applicant: FINISAR GERMANY GMBH, Berlin (DE)

(72) Inventors: Benjamin Voelker, Teltow (DE); Johannes Plumhof, Berlin (DE)

(73) Assignee: FINISAR GERMANY GMBH, Berlin (DE)

( * ) Notice: Subject to any disclaimer, the term of this patent is extended or adjusted under 35 U.S.C. 154(b) by 212 days.

(21) Appl. No.: 14/878,838

(22) Filed: Oct. 8, 2015

(65) Prior Publication Data
US 2017/0102511 A1   Apr. 13, 2017

(51) Int. Cl.
| | |
|---|---|
| *G01B 11/00* | (2006.01) |
| *G02B 7/00* | (2006.01) |
| *G01B 11/27* | (2006.01) |
| *G01M 11/00* | (2006.01) |
| *G02B 7/02* | (2006.01) |
| *G02B 3/00* | (2006.01) |
| *G02B 27/62* | (2006.01) |
| *G02B 7/04* | (2006.01) |
| *G02B 3/06* | (2006.01) |

(52) U.S. Cl.
CPC ............ *G02B 7/003* (2013.01); *G01B 11/272* (2013.01); *G01M 11/00* (2013.01); *G02B 3/0043* (2013.01); *G02B 3/0075* (2013.01); *G02B 7/005* (2013.01); *G02B 7/023* (2013.01); *G02B 7/04* (2013.01); *G02B 27/62* (2013.01); *G02B 3/06* (2013.01)

(58) Field of Classification Search
CPC ...... G01B 11/272; G01M 11/00; G02B 27/62; G02B 3/0043; G02B 3/0075; G02B 7/003; G02B 7/005; G02B 7/023; G02B 7/04; G02B 3/06

USPC .................................................. 356/399–401
See application file for complete search history.

(56) References Cited

U.S. PATENT DOCUMENTS 4,772,123 A * 9/1988 Radner ................ G02B 6/4221
257/E33.067
5,469,236 A * 11/1995 Roessel .................. G02B 23/08
352/94

(Continued)

OTHER PUBLICATIONS

European Search Report, as issued in connection with European Application No. 16 18 9876, dated Feb. 20, 2017, 7 pgs.

*Primary Examiner* — Isiaka Akanbi
(74) *Attorney, Agent, or Firm* — Maschoff Brennan

(57) ABSTRACT

A method of aligning a lens device includes:
coupling an optical free-space beam that propagates along a first direction into an access port of an optoelectronic component, the first, a second, and a third direction being mutually perpendicular;
positioning the lens device inside a free-space beam path, the lens device having an adjustment lens configured to focus radiation in only the second direction;
moving the lens device along the second direction to align the adjustment lens with respect to the access port at an initial aligned position at which the optical free-space beam is one-dimensionally focused by the adjustment lens and at least a portion of a resulting one-dimensionally focused beam is input into the access port; and
starting from the initial aligned position, moving the lens device in the second and/or third directions to position an optical element of the lens device in front of the access port.

14 Claims, 10 Drawing Sheets

(56) References Cited

U.S. PATENT DOCUMENTS

| | | | | |
|---|---|---|---|---|
| 5,666,450 | A * | 9/1997 | Fujimura | G02B 6/30 359/900 |
| 5,694,628 | A * | 12/1997 | Nishitani | G02B 7/10 396/373 |
| 7,202,952 | B2 * | 4/2007 | Hu | G01B 11/272 356/153 |
| 7,298,466 | B2 * | 11/2007 | Biet | G01B 11/272 356/138 |
| 7,456,945 | B2 * | 11/2008 | Shih | H01L 31/0203 257/E31.117 |
| 2002/0033941 | A1 * | 3/2002 | Seward | G01B 11/27 356/153 |
| 2002/0131178 | A1 | 9/2002 | Kusuyama | |
| 2006/0044799 | A1 | 3/2006 | Kim | |
| 2006/0244967 | A1 * | 11/2006 | Inoue | G01B 11/024 356/390 |
| 2013/0265661 | A1 | 10/2013 | Goto | |

\* cited by examiner

LENS DEVICE

BACKGROUND

1. The Field of the Invention

Some embodiments described herein relate to lens devices for optoelectronic components, methods of aligning lens devices with respect to optoelectronic components and optoelectronic devices that include at least one optoelectronic component and at least one lens device.

2. Background of the Invention

Unless otherwise indicated, the materials described in the background section are not prior art to the claims in the present application and are not admitted to be prior art by inclusion in this section.

Optoelectronic devices, such as electronic or optoelectronic transceivers or transponder modules, are increasingly used in electronic and optoelectronic communication. Such optoelectronic devices may for instance communicate with other devices by transmitting and/or receiving optical data signals.

In many optoelectronic devices, lenses need to be aligned with respect to optoelectronic components of the optoelectronic devices during the fabrication of the devices. The costs involved with the alignment procedure may be significant.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

By way of summary, disclosed embodiments are inter alia directed to methods of aligning lens devices with respect to optoelectronic components.

For example, one embodiment relates to a method of aligning a lens device with respect to an access port of an optoelectronic component, the method including:

coupling an optical free-space beam that propagates along a first direction into the access port of the optoelectronic component;

positioning the lens device inside a free-space beam path of the optical free-space beam, the lens device having an adjustment lens that is configured to focus radiation in only a second direction that lies in a plane perpendicular to the first direction;

moving the lens device along the second direction to align the adjustment lens with respect to the access port at an initial position at which the optical free-space beam is one-dimensionally focused by the adjustment lens and at least a portion of a resulting first one-dimensionally focused beam is input into the access port; and starting from the initial aligned position, moving the lens device in at least one of the second direction or a third direction that is perpendicular to each of the first and second directions to position an optical element of the lens device in front of the access port.

In embodiment, moving the lens device in at least one of the second direction or the third direction includes shifting the lens device by a predefined first distance along the second direction, the predefined first distance corresponding to a distance between the adjustment lens and the optical element along the second direction such that the optical element is aligned to the access port in the second direction; and moving the lens device along the third direction until the optical element is aligned to the access port in both the second and third directions.

This and other embodiments described herein may take advantage of the fact that the distance between the adjustment lens and the optical element is known and can be used to streamline the alignment procedure.

In one embodiment, the adjustment lens is a first adjustment lens and the lens device further includes a second adjustment lens that is configured to focus the optical free-space beam one-dimensionally in the third direction and located a predefined second distance from the optical element along the third direction. In this and other embodiments, moving the lens device in at least one of the second direction or the third direction may include moving the lens device along the third direction to align the second adjustment lens with respect to the access port such that the optical free-space beam is one-dimensionally focused by the second adjustment lens and at least a portion of a resulting second one-dimensionally focused beam is input into the access port; and shifting the lens device by the predefined second distance along the third direction such that the optical element is aligned to the access port in the third direction.

In one embodiment, the optoelectronic component has a first access port and a second access port, the access ports having a port distance from each other along the third direction.

In one embodiment, the lens device has a first optical element and a second optical element, the optical elements having a distance from each other along the third direction, the distance corresponding to the port distance, and each of the optical elements being located the predefined first distance from the adjustment lens along the second direction.

In one embodiment, coupling the optical free-space beam into the access port includes generating a first optical free-space beam and a second optical free-space beam, the first and second optical free-space beams being parallel to each other and having a predefined beam distance from each other along the third direction, said the predefined beam distance corresponding to the port distance.

In one embodiment, moving the lens device along the second direction to align the adjustment lens with respect to the access port includes aligning the adjustment lens with respect to the first and second access ports such that the adjustment lens one-dimensionally focuses the first and second optical free-space beams and such that a portion of each of two resulting one-dimensionally focused beams is input into a corresponding one of the first or second access port.

In one embodiment, moving the lens device in at least one of the second direction or the third direction to position the optical element of the lens device in front of the access port includes moving the lens device in at least one of the second direction or the third direction to position the first optical element in front of the first access port and the second optical element in front of the second access port.

In one embodiment, the method further includes evaluating first measurement values provided by a receiving unit of the optoelectronic component to determine when the lens device is at least at the initial aligned position and to determine when the optical element is positioned in front of the access port, the measurement values each indicating an amount of radiation being coupled into the access port at a given time.

In one embodiment, the method further includes evaluating first measurement values provided by a first receiving unit of the optoelectronic component to determine when the lens device is at the initial aligned position and to determine when the first optical element is positioned in front of the first access port, the first measurement values each indicating an amount of radiation being coupled into the first access port at a given time; and evaluating second measurement values provided by a second receiving unit of the optoelectronic component to determine when the lens device is at the initial aligned positioned and to determine when the second optical element is positioned in front of the second access port, the second measurement values each indicating an amount of radiation being coupled into the second access port at a given time.

In one embodiment, the method further includes, after positioning the lens device inside the free-space beam path, rotating the lens device around an axis that is parallel to the free-space beam path.

In one embodiment, the method further includes, after positioning the lens device inside the free-space beam path, shifting the lens device along an axis parallel to the free-space beam path.

In one embodiment, the method further includes, after step positioning the lens device inside the free-space beam path, rotating the lens device around an axis that is parallel to the second direction.

In one embodiment, the adjustment lens includes a cylindrical lens, where a symmetry axis of the cylindrical lens is parallel to the third direction.

In one embodiment, the first and second adjustment lenses include cylindrical lenses, where a symmetry axis of the first cylindrical adjustment lens is perpendicular to a symmetry axis of the second cylindrical adjustment lens.

In one embodiment, focal lengths of the first and second adjustment lenses are identical.

In one embodiment, the optical element includes a lens or an optical grating.

In one embodiment, the optical element includes a circular lens, the adjustment lens includes a cylindrical lens, and a focal length of the circular lens is identical to a focal length of the cylindrical adjustment lens.

In one embodiment, the adjustment lens includes a cylindrical lens and a length of the adjustment lens along the third direction is at least as long as the distance between the first optical element and the second optical element.

The method steps described above can be carried out automatically by an autonomous alignment apparatus. Such an alignment apparatus may be connected to the receiving unit(s) to evaluate their measurement values and to determine the relative position of the lens device with respect to the access ports of the optoelectronic component. To this end, the alignment apparatus may include a processing unit that is programmed to evaluate the measurement values of the receiving unit(s) and to calculate control signals for mechanical actuators which move the lens device as described above in response to the calculated control signals.

Another embodiment of the invention relates to a lens device including an adjustment lens configured to focus radiation one-dimensionally in a single direction and an optical element located a distance from the adjustment lens.

In one embodiment, the adjustment lens is a first adjustment lens and the lens device further includes a second adjustment lens that is configured to focus radiation one-dimensionally in a direction perpendicular to the single direction, the second adjustment lens being located a predefined second distance from the optical element along the perpendicular direction.

In one embodiment, the lens device has an outer surface and at least two optical elements.

In one embodiment, the first and second adjustment lenses include cylindrical lenses.

In one embodiment, the optical elements include circular lenses separated by a lens distance.

In one embodiment, a length of the first cylindrical adjustment lens in the perpendicular direction is at least as along as the lens distance.

In one embodiment, the cylindrical lenses and the circular lenses each include a convex surface section of the outer surface.

In one embodiment, a curving out radius of the convex surface sections is identical.

In one embodiment, focal lengths of the cylindrical lenses and the circular lenses are identical.

Another embodiment of the invention relates to an optoelectronic device including a lens device and an optoelectronic component where the lens device includes:

an adjustment lens configured to focus radiation one-dimensionally in a single direction, and an optical element located a distance from the adjustment lens.

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Additional features will be set forth in the description which follows, and in part will be obvious from the description, or may be learned by the practice of the teachings herein. Features of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages of the invention are obtained will be readily understood a more particular description of the invention, briefly summarized above, will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF SOME EXAMPLE EMBODIMENTS

Figure 1:
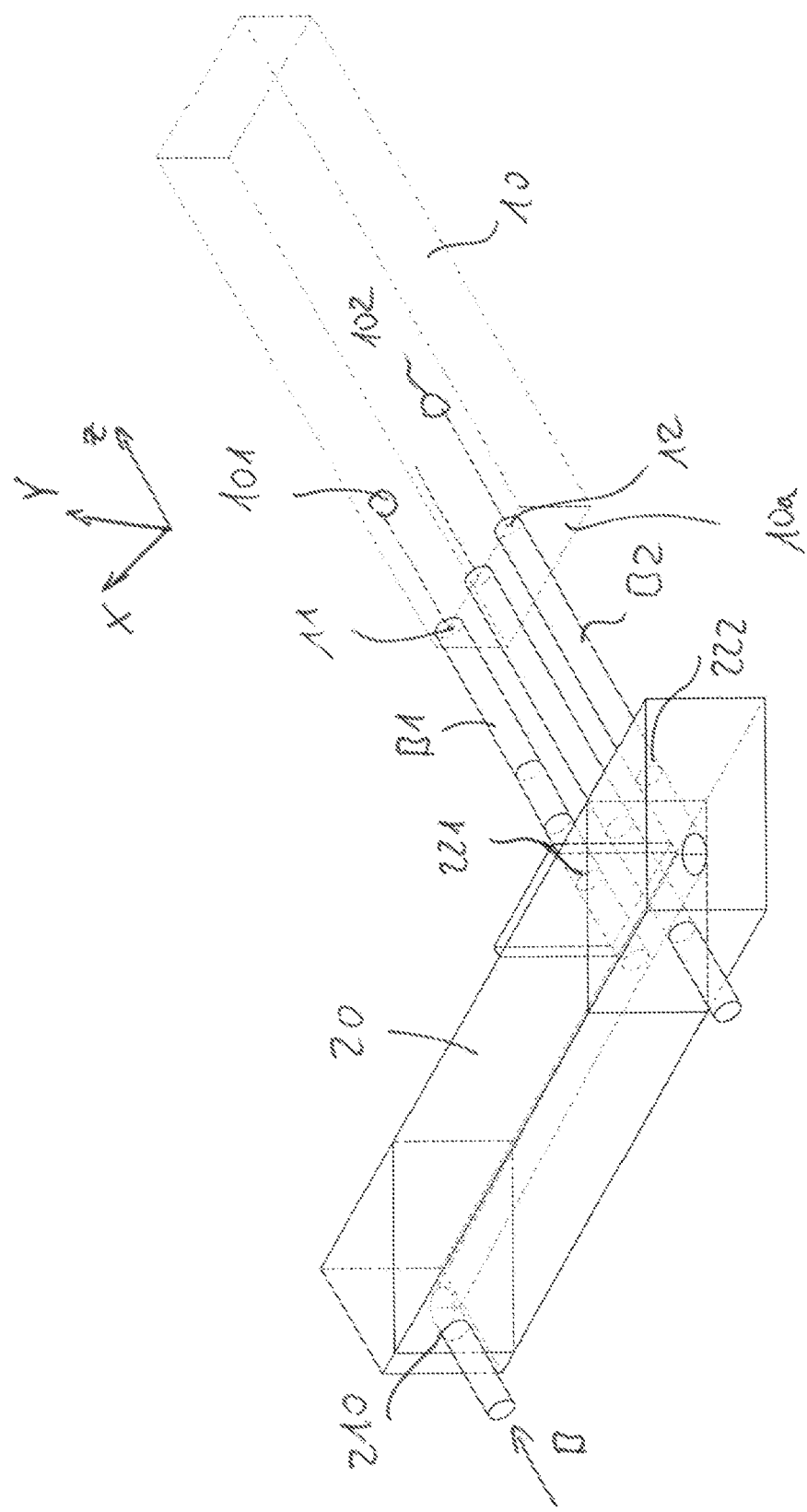
FIG. 1 shows an example embodiment of an optoelectronic component before aligning a lens device in front of access ports of the optoelectronic component.

In the following detailed description of example embodiments, reference is made to the accompanying drawings that show, by way of illustration, specific embodiments of the invention. In the drawings, like numerals describe substantially similar components throughout the several views. These embodiments are described in sufficient detail to enable those skilled in the art to practice the invention. Other embodiments may be utilized and structural, logical and electrical changes may be made without departing from the scope of the present invention. Moreover, it is to be understood that the various embodiments of the invention, although different, are not necessarily mutually exclusive. For example, a particular feature, structure, or characteristic described in one embodiment may be included within other embodiments. The following detailed description is, therefore, not to be taken in a limiting sense, and the scope of the present invention is defined only by the appended claims, along with the full scope of equivalents to which such claims are entitled.

It will be readily understood that the present invention, as generally described and illustrated in the figures herein, could vary in a wide range. Thus, the following more detailed description of the example embodiments of the present invention, as represented in the figures, is not intended to limit the scope of the invention, as claimed, but is merely representative of example embodiments of the invention.

Figure 2:
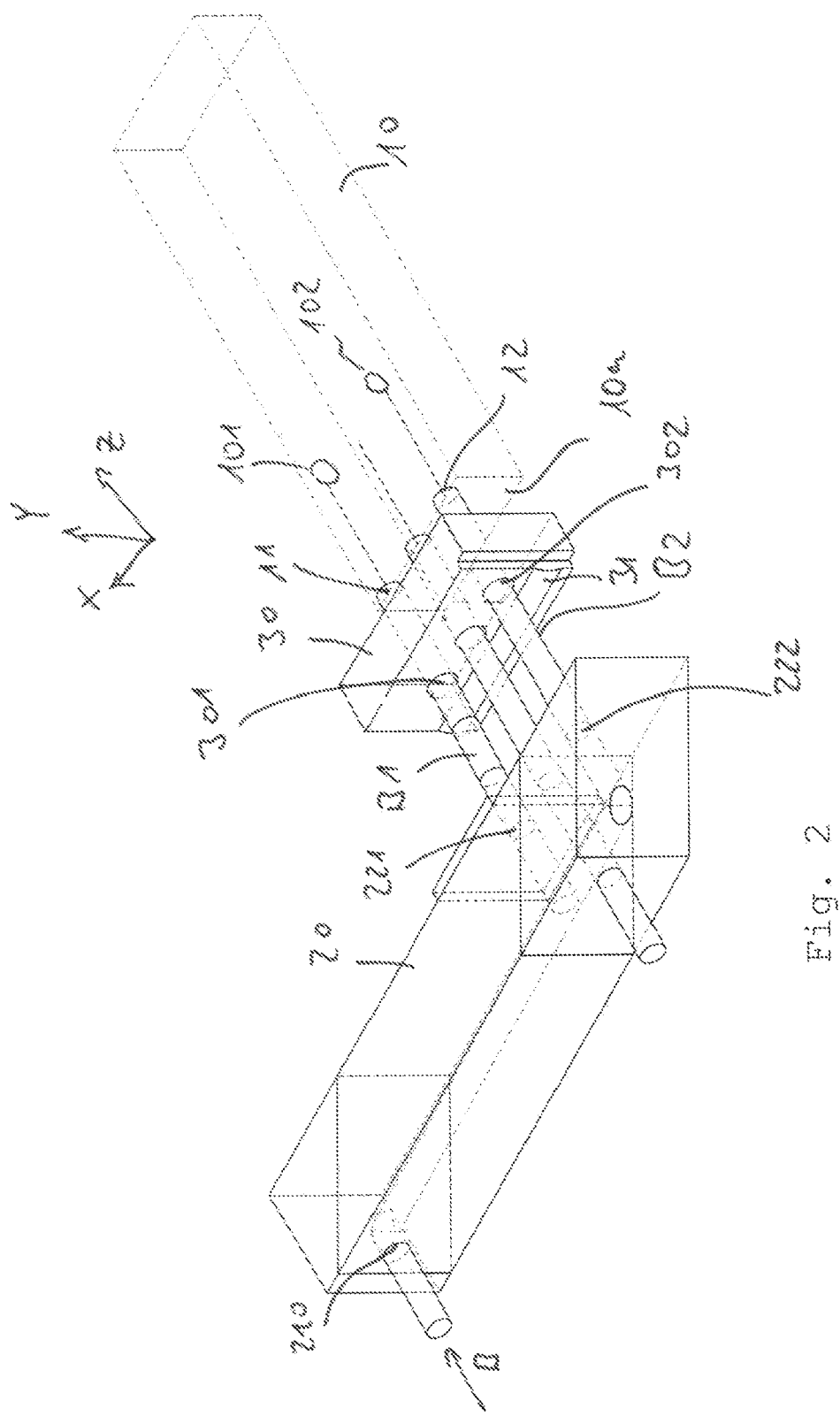
FIG. 2 shows the optoelectronic component of FIG. 1 after aligning a lens device in front of the access ports of the optoelectronic component.

FIG. 1 shows an example embodiment of an optoelectronic component, generally designated at 10, before aligning a lens device in front of first and second access ports 11 and 12 of the optoelectronic component 10, arranged in accordance with at least one embodiment described herein. FIG. 2 shows the optoelectronic component 10 of FIG. 1 after aligning a lens device 30 in front of the access ports 11 and 12 of the optoelectronic component 10, arranged in accordance with at least one embodiment described herein. The first access port 11 may be optically coupled to a first receiving unit 101 of the optoelectronic component 10, and the second access port 12 may be optically coupled to a second receiving unit 102 of the optoelectronic component 10. The receiving units 101 and 102 may include photodetectors.

Some embodiments described herein relate to methods of aligning lens devices with respect to optoelectronic components, such as a method of aligning the lens device 30 of FIG. 2 to the optoelectronic component 10 of FIGS. 1 and 2. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

To align the lens device 30 (see FIG. 2) with respect to the first and second access ports 11 and 12 of the optoelectronic component 10, one or more of the following steps may be carried out:

In a first step, two parallel (collimated) optical free-space beams B1 and B2 that propagate along a first direction Z may be coupled into the access ports 11 and 12 of the optoelectronic component 10. In the illustrated example, the optical free-space beams B1 and B2 may be generated by a beam splitter 20 that includes an input port 210 for inputting an input beam B and two output ports 221 and 222. The optical free-space beams B1 and B2 may be generated by the beam splitter 20 by splitting the input beam B received from a beam source into the optical free-space beams B1 and B2.

During adjustment of a relative position between the optical free-space beams B1 and B2 and the allocated corresponding access ports 11 and 12, radiation received by the receiving units 101 and 102 may be evaluated. To ease or enable this evaluation, each of the receiving units 101 and 102 may generate measurement values that indicate a received amount of radiation at a given time.

The adjustment of the two parallel optical free-space beams B1 and B2 with respect to the allocated corresponding access ports 11 and 12 may be relatively simple since a spot size of each of the free-space beams B1 and B2 may be relatively large.

After adjusting the relative position between the optical free-space beams B1 and B2 and the allocated corresponding access ports 11 and 12 and after reaching an optimum relative position as shown in FIG. 1, the lens device 30 may be moved so as to be located in a beam path of the optical free-space beams B1 and B2 as shown in FIG. 2.

In the illustrated example, the lens device 30 may include an adjustment lens 31 that is configured to focus radiation one-dimensionally (with respect to optical free-space beams B1 and B2 and the access ports 11 and 12 in FIGS. 1 and 2). Focusing radiation one-dimensionally may include focusing radiation in only one direction or primarily in one direction, for instance along a second direction Y. The second direction Y lies in a plane that is perpendicular to the first direction Z.

In the illustrated example, the lens device 30 further includes a first optical element 301 and a second optical element 302. Hereinafter, it is assumed in an example fashion that the optical elements 301 and 302 are lenses that are configured to focus radiation two-dimensionally (with respect to optical free-space beams B1 and B2 and the access ports 11 and 12 in FIGS. 1 and 2) along the second direction Y and along a third direction X. The third direction X is perpendicular to each of the first and second directions Y and Z. Although described herein as lenses, in other embodiments, the optical elements 301 and 302 may include gratings or other optical elements. In addition, while two optical elements 301 and 302 are illustrated in FIG. 2, more generally, the lens device 30 may include one or more optical elements.

Then, the lens device 30 may be aligned with respect to the optoelectronic component 10 such that the first optical element 301 may be located in front of the first access port 11 and the second optical element 302 may be located in front of the second access port 12. To this end, the lens device 30 may be moved along one or both of the second direction Y or the third direction X.

FIGS. 3-6 show an example embodiment of a method of aligning the lens device 30 of FIG. 2 with respect to the access ports 11 and 12 of the optoelectronic component 10 of FIGS. 1 and 2, arranged in accordance with at least one embodiment described herein.

Figure 3:
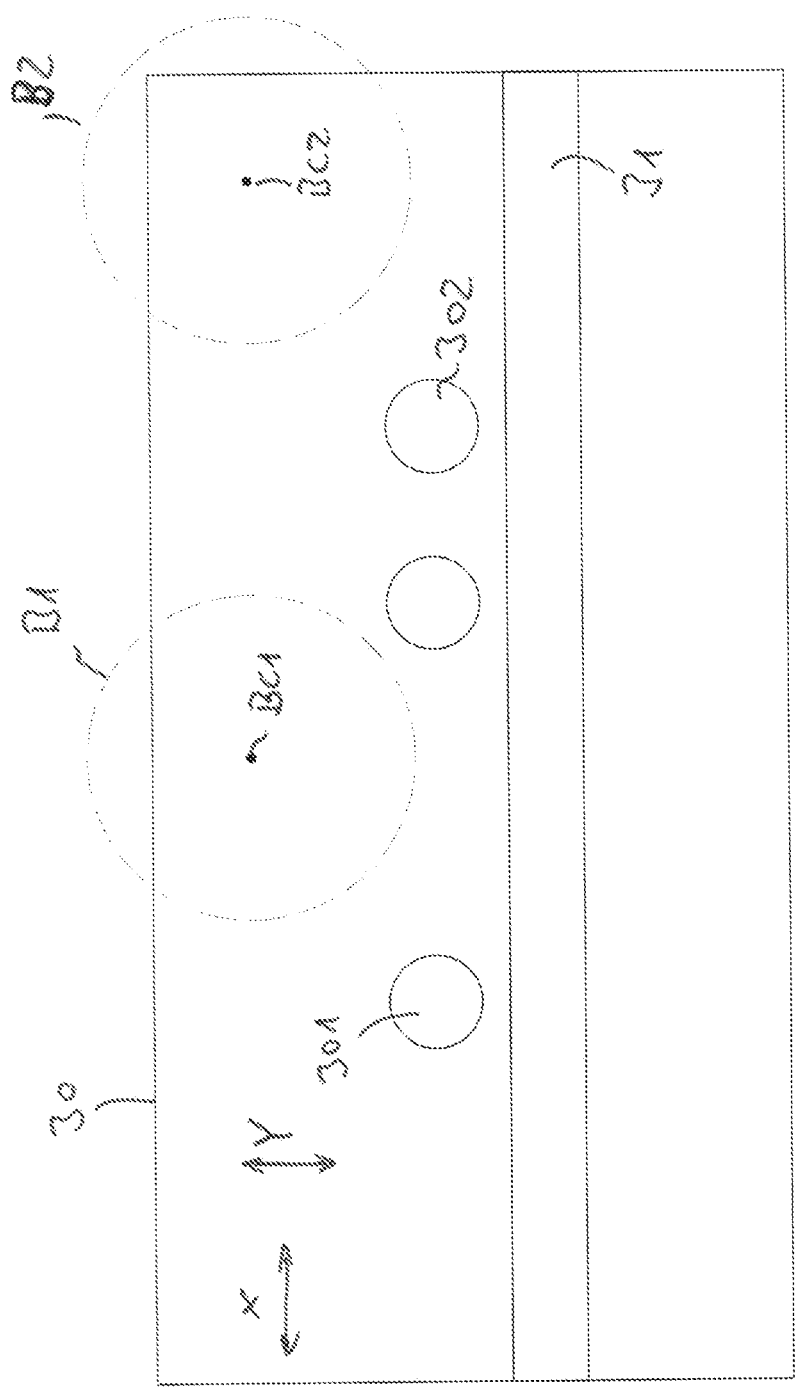
FIGS. 3-6 show an example embodiment of a method of aligning the lens device of FIG. 2 with respect to the access ports of the optoelectronic component of FIG. 1.

In more detail, FIG. 3 shows in an example fashion an initial position of the lens device 30 with respect to the optical free-space beams B1 and B2 before alignment in X- and Y-direction. In FIG. 3, center areas of the optical free-space beams are indicated by reference signs BC1 and BC2, respectively.

In a first adjustment step, the lens device 30 may be moved along the second direction Y (i.e. vertically in FIG. 3) until the optical free-space beams B1 and B2 are coupled into the adjustment lens 31.

Figure 4:
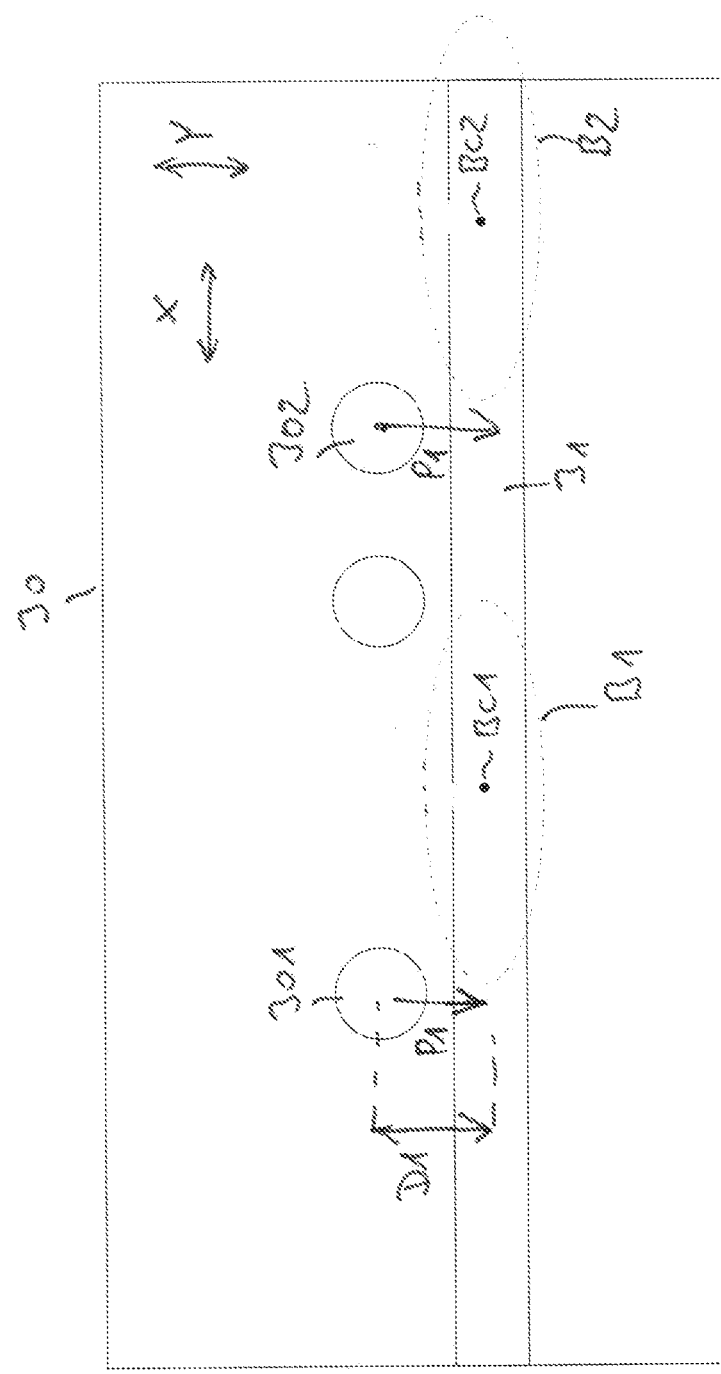

FIG. 4 shows the optical free-space beams B1 and B2 after being focused one-dimensionally along the second direction Y by the adjustment lens 31. The measurement values of the receiving units 101 and 102 may noticeably increase as soon as the adjustment lens 31 is located in front of the access ports 11 and 12 because of the one-dimensional focusing provided by the adjustment lens 31. Therefore, the position according to FIG. 4 in which the adjustment lens 31 is aligned in the second direction Y to focus the optical free-space beams B1 and B2 at least partially into the access ports 11 and 12 can be found by evaluating the measurement values that are generated by the receiving units 101 and 102. This position may be referred to herein as an initial aligned position.

Starting from the initial aligned position as shown in FIG. 4, the lens device 30 may be moved in at least one of the second direction or the third direction to position the optical elements 301 and 302 in front of the access ports 11 and 12. For example, starting from the initial aligned position, the lens device 30 may be shifted by a predefined first distance D1 along arrow P1, i.e. along the second direction Y (i.e. vertically in FIG. 4). The predefined first distance D1 may correspond to a given distance between the adjustment lens 31 and the optical elements 301 and 302 along the second direction Y. For example, the first distance D1 may include a center-to-center-distance between a center (in the second direction Y) of the adjustment lens 31 and a center (in the second direction Y) of the optical elements 301 and 302.

Figure 5:
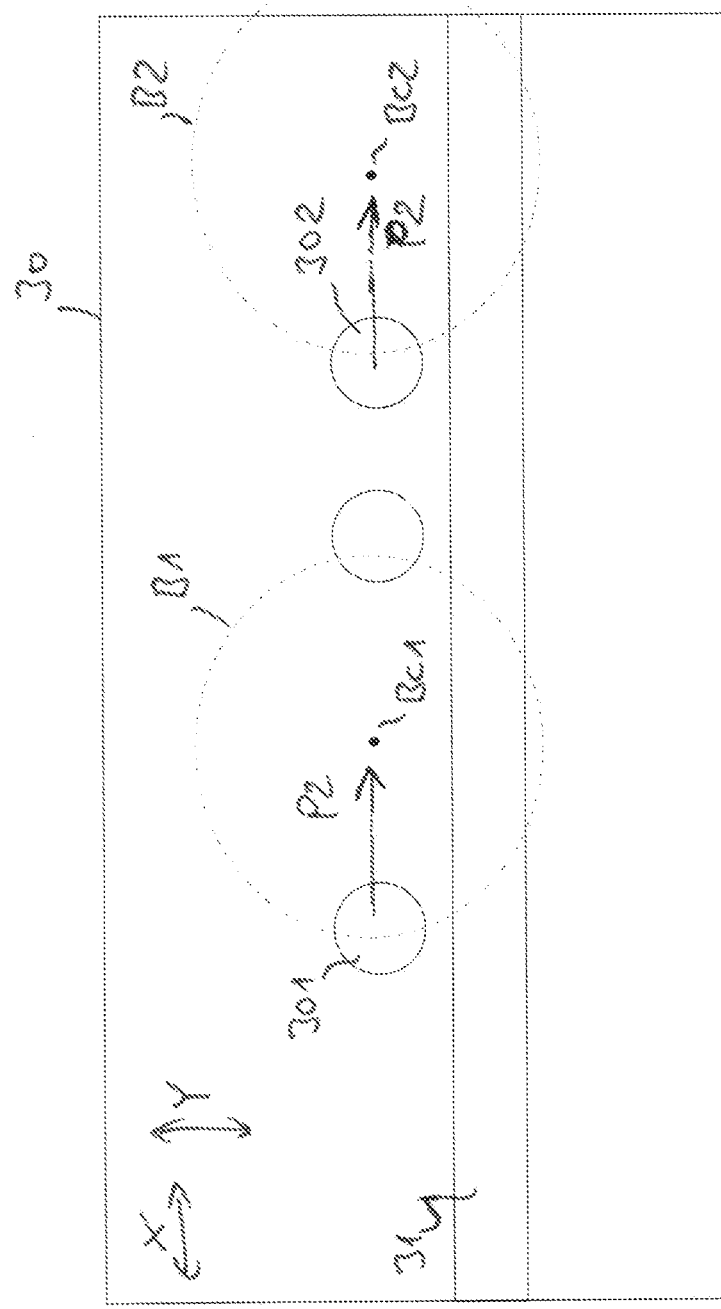

FIG. 5 shows the lens device 30 after being shifted along arrow P1. At this point, the optical elements 301 and 302 may already be substantially or exactly aligned with respect to the optical free-space beams B1 and B2 as well as with respect to the access ports 11 and 12 along the second direction Y (i.e. vertically in FIG. 5). As such, from this point, the lens device 30 may be adjusted substantially and/or exclusively along the third direction X (i.e. horizontally in FIG. 5) to complete alignment.

Figure 6:
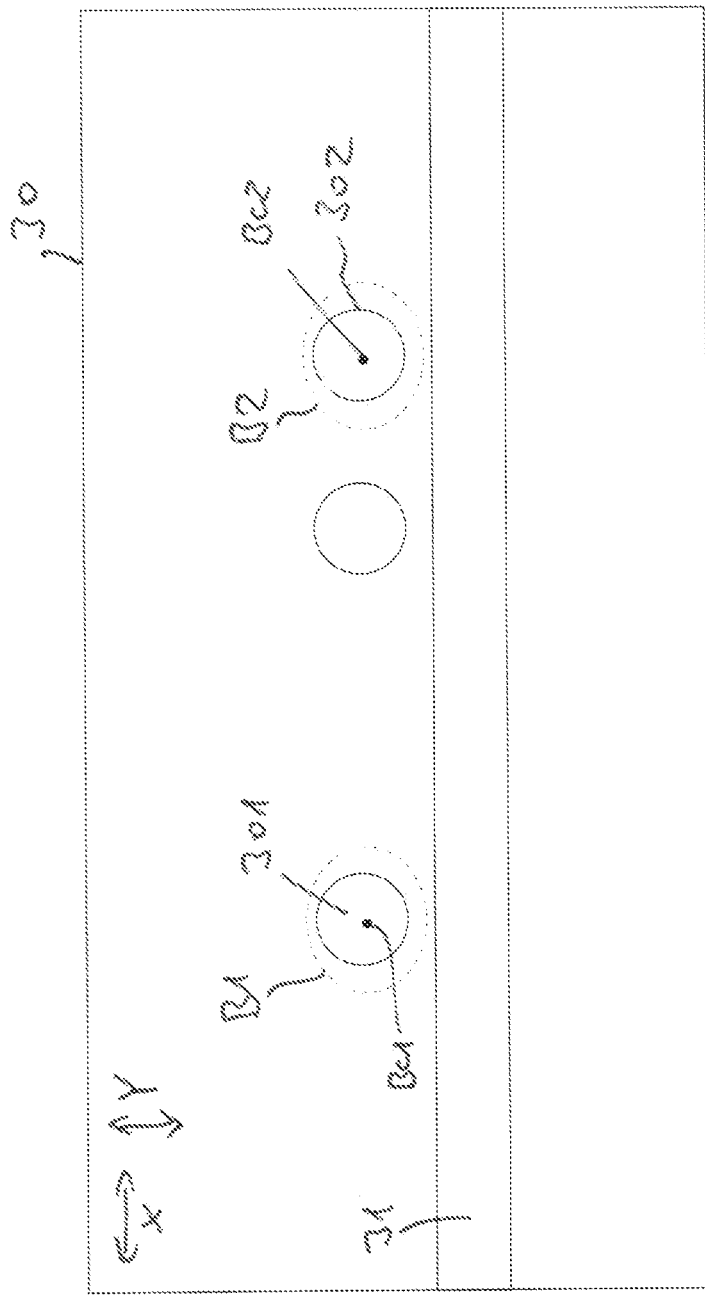

Therefore, in a next alignment step, the lens device 30 may be moved along the third direction X, only. The movement in the third direction X is indicated by arrows P2 in FIG. 5. Because of the two-dimensional focusing of the optical free-space beams B1 and B2 by the optical elements 301 and 302, the measurement values generated by the receiving units 101 and 102 may significantly increase as soon as the optical elements 301 and 302 are located in the beam path of the optical free-space beams B1 and B2, respectively. The optical free-space beams B1 and B2, which are now two-dimensionally focused by the optical elements 301 and 302 onto the access ports 11 and 12, are illustrated in FIG. 6 in an example fashion. In the position shown in FIG. 6, the optical elements 301 and 302 may be located in front of the access ports 11 and 12 because of the previous alignment of the optical free-space beams B1 and B2 with respect to the access ports 11 and 12 (as discussed above with reference to FIG. 1).

Before or after moving the lens device 30 horizontally and vertically as described above, the lens device 30 may be rotated around an axis that is parallel to the free-space beam paths and the first direction Z to compensate for a misalignment of an angle of the lens device 30 with respect to a plane 10a (see FIG. 2) in which the access ports 11 and 12 lie. An optimum angle of the lens device 30 with respect to the plane 10a can be found by evaluating the measurement values that are generated by the receiving units 101 and 102. The optimum angle may be found when the measurement values reach their respective peak values.

Further, the lens device 30 may be shifted along the first direction Z, i.e. along the axis parallel to the free-space beam path, to determine an optimum distance between the lens device 30 and the optoelectronic component 10. The optimum distance may be found when the measurement values of the receiving units 101 and 102 reach their respective peak values.

Further, the lens device 30 may be rotated around an axis that is parallel to the second direction Y. An optimum rotation angle about the axis that is parallel to the second direction Y may be found when the measurement values of the receiving units 101 and 102 reach their respective peak values.

Figure 7:
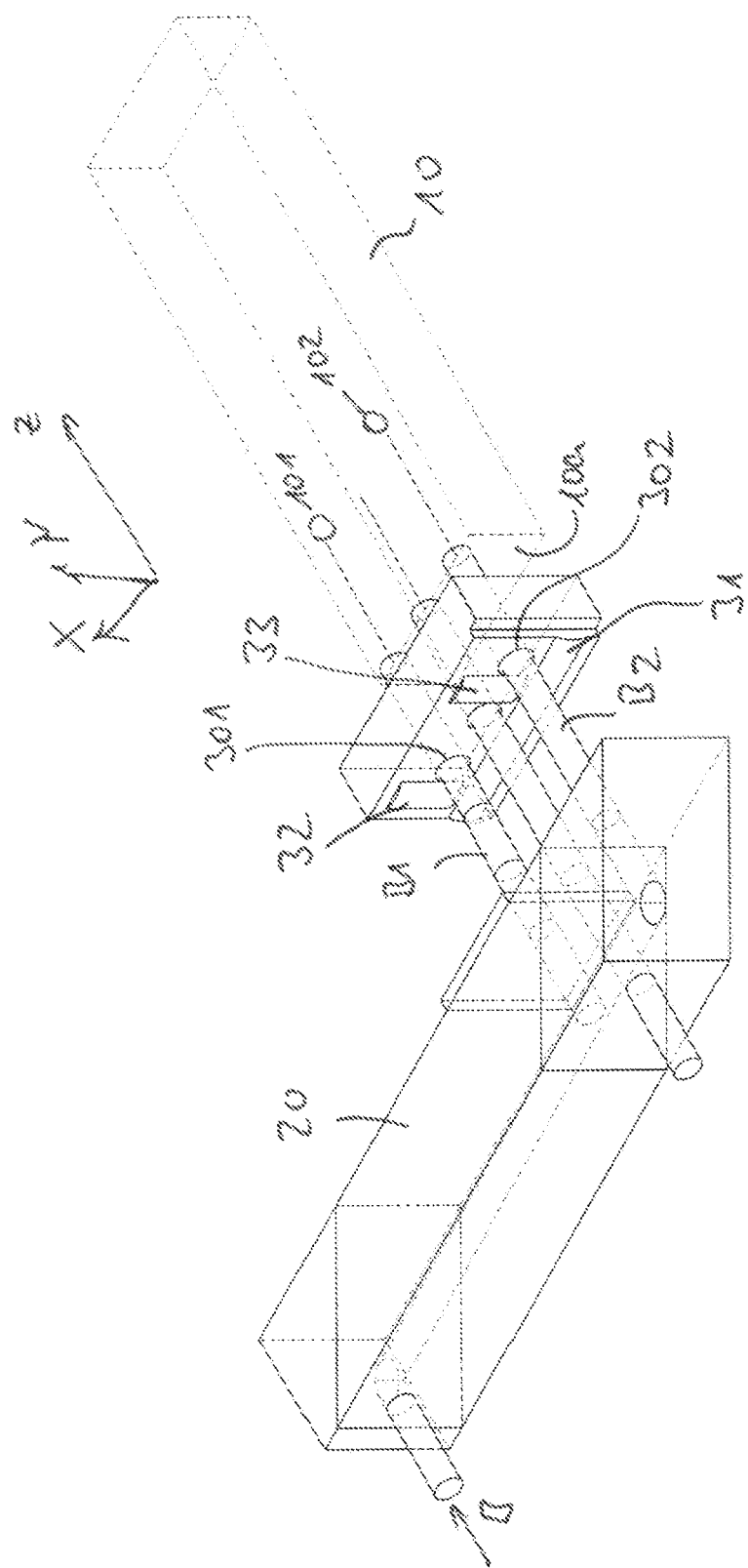
FIG. 7 shows the optoelectronic component of FIG. 1 after aligning another example embodiment of a lens device in front of the access ports of the optoelectronic component.

FIG. 7 shows the optoelectronic component 10 of FIG. 1 after aligning another example embodiment of a lens device 30 in front of the access ports 11 and 12 of the optoelectronic component 10, arranged in accordance with at least one embodiment described herein. In the illustrated example, the lens device 30 of FIG. 7 includes an adjustment lens 31 that is configured to focus radiation one-dimensionally in the second direction Y, and two adjustment lenses 32 and 33 that are configured to focus radiation one-dimensionally in the third direction X.

Figure 8:
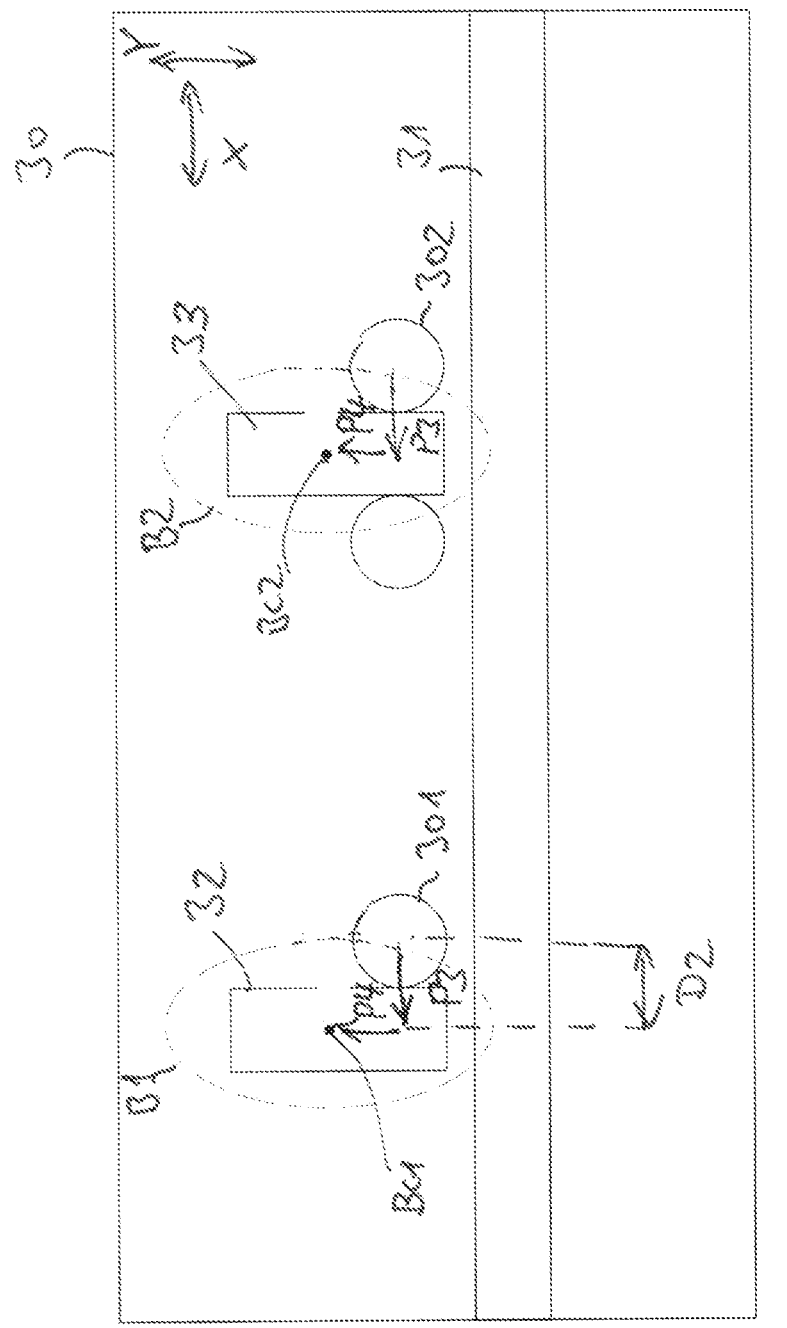
FIG. 8 shows an example embodiment of a method of aligning the lens device of FIG. 7 in front of the access ports of the optoelectronic component.

FIG. 8 shows an example embodiment of a method of aligning the lens device 30 of FIG. 7 in front of the access ports 11 and 12 of the optoelectronic component 10, arranged in accordance with at least one embodiment described herein. In the example of FIG. 8, during the alignment procedure, the adjustment lenses 32 and 33 of FIG. 7 have reached a position in front of the access ports 11 and 12 (see FIG. 7). From this position, the lens device 30 can be shifted by a predefined second distance D2 along arrow P3, i.e. along the third direction X. The predefined second distance D2 may correspond to a given distance between the adjustment lenses 32 and 33 and the corresponding optical elements 301 and 302 along the third direction X. For example, the second distance D2 may include a center-to-center-distance between a center (in the third direction X) of the adjustment lenses 32 and 33 and a center (in the third direction X) of the optical elements 301 and 302.

Afterwards, it may be sufficient to shift the lens device 30 along arrow P4 (along the second direction Y) to accurately position the optical elements 301 and 302 in front of the access ports 11 and 12. In the example of FIGS. 7 and 8, the alignment procedure may utilize the adjustment lenses 32 and 33 with or without utilizing the adjustment lens 31.

Figure 9:
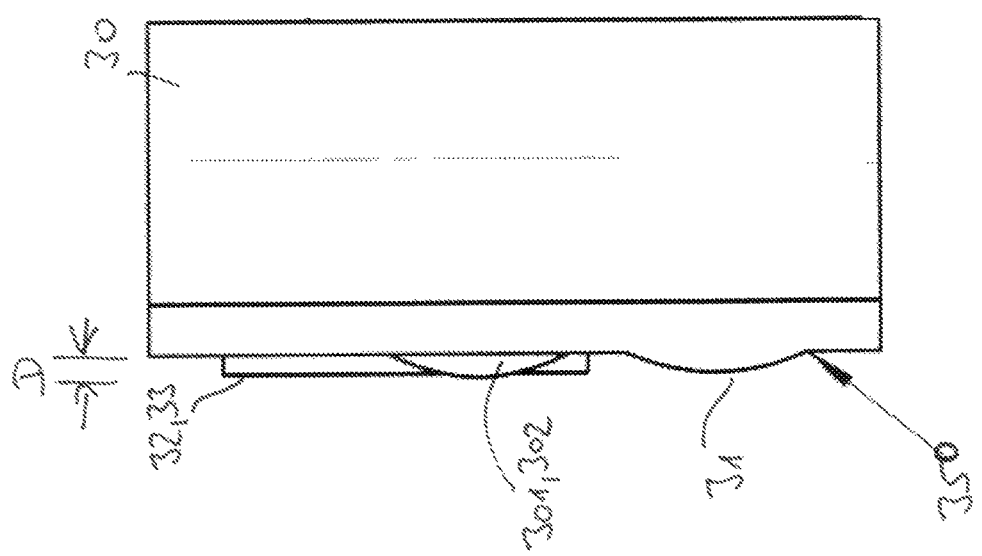
FIG. 9 shows a side view of the lens device of FIGS. 7 and 8.

FIG. 9 shows a side view of the lens device 30 of FIGS. 7 and 8, arranged in accordance with at least one embodiment described herein. The lens device 30 of FIGS. 7-9 may be formed by a single block of transparent (with respect to radiation that is detectable by the optoelectronic component 10) material.

The optical elements 301 and 302 may include circular lenses. The adjustment lenses 31, 32 and 33 may include cylindrical lenses.

In the illustrated example, the cylindrical lenses 31, 32, and 33 as well as the circular lenses 301 and 302 may each be formed by a convex surface section of the outer surface 350 of the lens device 30. In some embodiments, a curving out distance (or radius) D and/or a radius of curvature of the convex surface sections may be identical. Alternatively or additionally, focal lengths of the cylindrical lenses 31, 32, and 33 and focal lengths of the circular lenses 301 and 302 may be identical.

Figure 11:
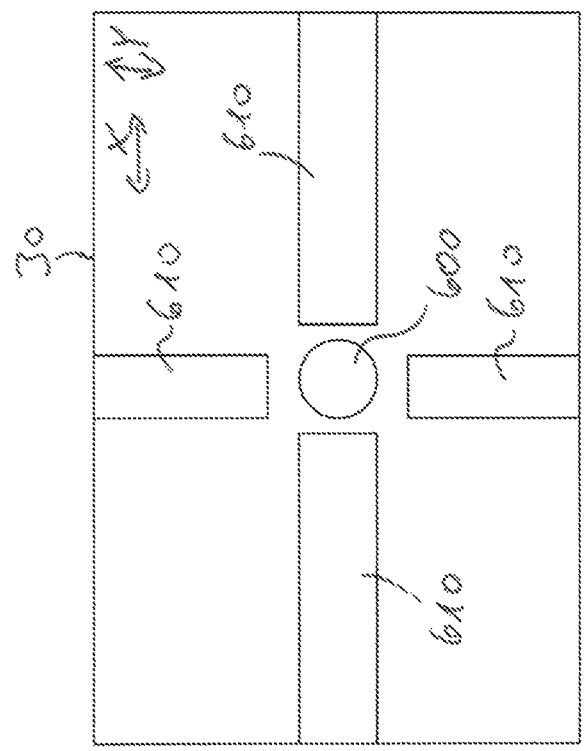
FIG. 11 shows yet another example embodiment of a lens device.
Figure 10:
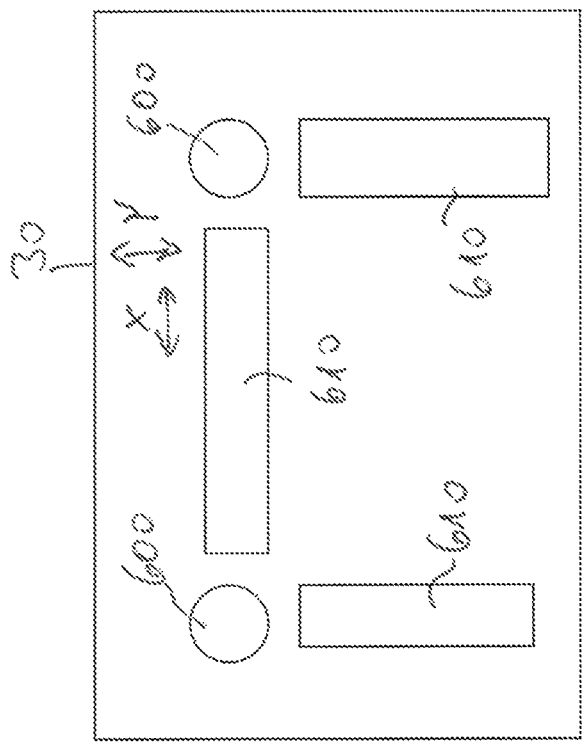
FIG. 10 shows another example embodiment of a lens device.

FIG. 10 shows another example embodiment of the lens device 30, arranged in accordance with at least one embodiment described herein. FIG. 11 shows yet another example embodiment of the lens device 30, arranged in accordance with at least one embodiment described herein. The embodiments of the lens device 30 of FIGS. 10 and 11 can be used to couple one or more beams into an optoelectronic component, such as the optoelectronic component 10 of FIGS. 1, 2, and 7. In the illustrated examples of FIGS. 10 and 11, each of the lens devices 30 includes at least one optical element 600 and at least one adjustment lens 610. The optical elements 600 may include lenses that are configured to focus radiation two-dimensionally along the second direction Y and along the third direction X. The adjustment lenses 610 may include lenses that are configured to focus radiation one-dimensionally, only, along the second direction Y or along the third direction X.

The optical elements 600 may include circular lenses, and the adjustment lenses 610 may include cylindrical lenses.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of aligning a lens device with respect to an access port of an optoelectronic component, the method comprising:
    coupling an optical free-space beam that propagates along a first direction into the access port of the optoelectronic component;
    positioning the lens device inside a free-space beam path of the optical free-space beam, the lens device having a first adjustment lens that is configured to focus radiation in only a second direction that lies in a plane perpendicular to the first direction, wherein the first adjustment lens is located a predefined first distance from the optical element and the lens device further comprises a second adjustment lens that is configured to focus the optical free-space beam one-dimensionally in the third direction and is located a predefined second distance from the optical element along the third direction;
    moving the lens device along the second direction to align the adjustment lens with respect to the access port at an initial aligned position at which the optical free-space beam is one-dimensionally focused by the adjustment lens and at least a portion of a resulting first one-dimensionally focused beam is input into the access port; and
    starting from the initial aligned position, moving the lens device in at least one of the second direction or a third direction that is perpendicular to each of the first and second directions to position an optical element of the lens device in front of the access port, the moving the lens device in the at least one of the second direction or the third direction includes:
        moving the lens device along the third direction to align the second adjustment lens with respect to the access port such that the optical free-space beam is one-dimensionally focused by the second adjustment lens and at least a portion of a resulting second one-dimensionally focused beam is input into the access port; and
        shifting the lens device by the predefined second distance along the third direction such that the optical alignment is aligned to the access port in the third direction.

2. The method of claim 1, wherein moving the lens device in at least one of the second direction or the third direction includes:
    shifting the lens device by a predefined first distance along the second direction, the predefined first distance corresponding to a distance between the first adjustment lens and the optical element along the second direction such that the optical element is aligned to the access port in the second direction; and
    moving the lens device along the third direction until the optical element is aligned to the access port in both the second and third directions.

3. The method of claim 1, wherein:
    the optoelectronic component has a first access port and a second access port, the access ports having a port distance from each other along the third direction;
    the lens device has a first optical element and a second optical element, the optical elements having a distance from each other along the third direction, the distance corresponding to the port distance, and each of the optical elements being located the predefined first distance from the first adjustment lens along the second direction;
    coupling the optical free-space beam into the access port includes generating a first optical free-space beam and a second optical free-space beam, the first and second optical free-space beams being parallel to each other and having a predefined beam distance from each other along the third direction, the predefined beam distance corresponding to the port distance;
    moving the lens device along the second direction to align the first adjustment lens with respect to the access port includes aligning the first adjustment lens with respect to the first and second access ports such that the first adjustment lens one-dimensionally focuses the first and second optical free-space beams and such that a portion of each of two resulting one-dimensionally focused beams is input into a corresponding one of the first or second access port; and
    moving the lens device in at least one of the second direction or the third direction to position the optical element of the lens device in front of the access port includes moving the lens device in at least one of the second direction or the third direction to position the first optical element in front of the first access port and the second optical element in front of the second access port.

4. The method of claim 1, further comprising evaluating measurement values provided by a receiving unit of the optoelectronic component to determine when the lens device is at the initial aligned position and to determine when the optical element is positioned in front of the access port, the measurement values each indicating an amount of radiation being coupled into the access port at a given time.

5. The method of claim 3, further comprising:
evaluating first measurement values provided by a first receiving unit of the optoelectronic component to determine when the lens device is at the initial aligned position and to determine when the first optical element is positioned in front of the first access port, the first measurement values each indicating an amount of radiation being coupled into the first access port at a given time; and
evaluating second measurement values provided by a second receiving unit of the optoelectronic component to determine when the lens device is at the initial aligned position and to determine when the second optical element is positioned in front of the second access port, the second measurement values each indicating an amount of radiation being coupled into the second access port at a given time.

6. The method of claim 3, further comprising, after positioning the lens device inside the free-space beam path, rotating the lens device around an axis that is parallel to the free-space beam path.

7. The method of claim 3, further comprising, after positioning the lens device inside the free-space beam path, shifting the lens device along an axis parallel to the free-space beam path.

8. The method of claim 3, further comprising, after positioning the lens device inside the free-space beam path, rotating the lens device around an axis that is parallel to the second direction.

9. The method of claim 1, wherein the first adjustment lens comprises a cylindrical lens, a symmetry axis of which is parallel to the third direction.

10. The method of claim 1, wherein the first and second adjustment lenses comprise cylindrical lenses, a symmetry axis of the first cylindrical adjustment lens being perpendicular to a symmetry axis of the second cylindrical adjustment lens.

11. The method of claim 1, wherein focal lengths of the first and second adjustment lenses are substantially identical.

12. The method of claim 1, wherein the optical element comprises a lens or an optical grating.

13. The method of claim 12, wherein the optical element comprises a circular lens, the first adjustment lens comprises a cylindrical lens, and a focal length of the circular lens is identical to a focal length of the cylindrical lens.

14. The method of claim 3, wherein the first adjustment lens comprises a cylindrical lens and a length of the adjustment lens along the third direction is at least as long as the distance between the first optical element and second optical element.

* * * * *